United States Patent
Moorer, Jr.

(10) Patent No.: US 7,388,512 B1
(45) Date of Patent: Jun. 17, 2008

(54) DIVER LOCATING METHOD AND APPARATUS

(75) Inventor: Daniel F. Moorer, Jr., 5371 Desert Mountain Ct., Boulder, CO (US) 80301

(73) Assignee: Daniel F. Moorer, Jr., Boulder, CO (US)

( * ) Notice: Subject to any disclaimer, the term of this patent is extended or adjusted under 35 U.S.C. 154(b) by 146 days.

(21) Appl. No.: 11/218,790

(22) Filed: Sep. 2, 2005

Related U.S. Application Data

(60) Provisional application No. 60/607,336, filed on Sep. 3, 2004.

(51) Int. Cl.
    *H04B 13/02* (2006.01)
(52) U.S. Cl. .................. 340/850; 340/539.1; 367/131; 367/141
(58) Field of Classification Search ................ 340/531, 340/539.1, 455, 850; 367/131–134, 138, 367/141
    See application file for complete search history.

(56) References Cited

U.S. PATENT DOCUMENTS

| | | | |
|---|---|---|---|
| 3,045,206 A | 7/1962 | Ahrens | |
| 3,541,717 A | 11/1970 | Grayson | |
| 3,953,843 A | 4/1976 | Codina | |
| 3,969,712 A | 7/1976 | Butman et al. | |
| 3,986,161 A | 10/1976 | MacKellar | |
| 4,040,135 A | 8/1977 | Arnold | |
| 4,079,364 A | 3/1978 | Antenore | |
| 4,121,200 A | 10/1978 | Colmenero | |
| 4,187,502 A | 2/1980 | Beverly et al. | |
| 4,307,449 A | 12/1981 | Strubin | |
| 4,336,591 A | 6/1982 | Berdzar et al. | |
| 4,337,527 A | 6/1982 | Delagrange et al. | |
| 4,459,689 A | 7/1984 | Biber | |
| 4,635,242 A | 1/1987 | Hart | |
| 4,747,085 A | 5/1988 | Dunegan et al. | |
| 4,932,009 A | 6/1990 | Lynch | |
| 5,019,822 A | 5/1991 | Kirkland | |
| 5,049,859 A | 9/1991 | Arnell | |
| 5,079,753 A | 1/1992 | Suggs | |
| 5,097,254 A | 3/1992 | Merrithew | |
| 5,099,455 A | 3/1992 | Parra | |
| 5,148,412 A | 9/1992 | Suggs | |
| 5,168,471 A | 12/1992 | Parra | |
| 5,185,725 A | 2/1993 | Kent et al. | |
| 5,241,516 A | 8/1993 | Kruchowy et al. | |
| 5,303,206 A | 4/1994 | Bemb et al. | |
| 5,331,602 A | 7/1994 | McLaren | |
| 5,410,519 A | 4/1995 | Hall et al. | |
| 5,517,199 A | 5/1996 | DiMattei | |

(Continued)

*Primary Examiner*—Davetta W. Goins
*Assistant Examiner*—Hongmin Fan
(74) *Attorney, Agent, or Firm*—Sheridan Ross P.C.

(57) ABSTRACT

A system for locating a diver is provided. The system includes a diver module for association with a diver that is capable of producing both an audible frequency signal to assist in locating the diver while submerged, and a radio frequency signal to assist in locating the diver when surfaced. In addition, the diver module includes a switch to enable the initiation of an active mode of the diver module. The diver module may also include a receiver visual display to indicate the direction to another diver module or to a boat module. The location signal boat module provides a boat operator with an indication of the direction from which a location signal is being received.

20 Claims, 9 Drawing Sheets

U.S. PATENT DOCUMENTS

| | | |
|---|---|---|
| 5,523,982 A | 6/1996 | Dale |
| 5,563,849 A | 10/1996 | Hall et al. |
| 5,666,326 A | 9/1997 | Holzschuh |
| 5,666,647 A | 9/1997 | Maine |
| 5,764,763 A | 6/1998 | Jensen et al. |
| 5,784,399 A | 7/1998 | Sun |
| 5,905,464 A | 5/1999 | Lanciaux |
| 5,907,281 A | 5/1999 | Miller, Jr. et al. |
| 5,956,291 A | 9/1999 | Nehemiah et al. |
| 6,057,759 A * | 5/2000 | Marsh .................... 340/539.11 |
| 6,084,827 A | 7/2000 | Johnson et al. |
| 6,108,272 A | 8/2000 | Fox |
| 6,272,073 B1 | 8/2001 | Doucette et al. |
| 6,362,778 B2 | 3/2002 | Neher |
| 6,396,769 B1 | 5/2002 | Polany |
| 6,400,482 B1 | 6/2002 | Lupton et al. |
| 6,711,095 B1 * | 3/2004 | Daniels ...................... 367/134 |
| 6,721,234 B2 | 4/2004 | Thomas |
| 6,762,678 B2 | 7/2004 | Arens |
| 6,769,508 B1 | 8/2004 | O'Connor |
| 6,856,578 B2 * | 2/2005 | Magine et al. .............. 367/134 |
| 7,148,811 B1 * | 12/2006 | Bustamante et al. ........ 340/850 |
| 2001/0030603 A1 | 10/2001 | Arens |
| 2002/0109601 A1 * | 8/2002 | Arens ...................... 340/573.1 |

* cited by examiner

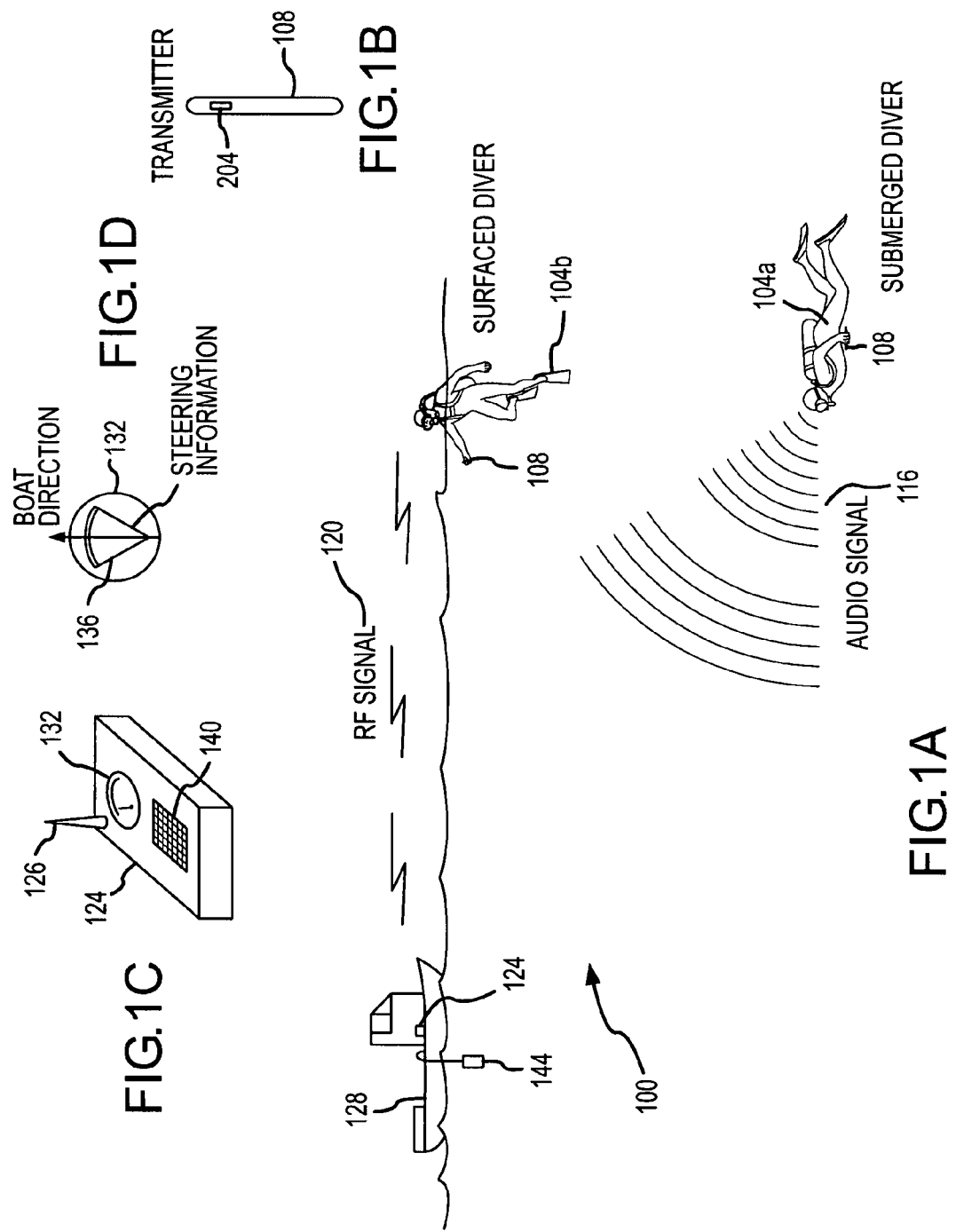

DIVER LOCATING METHOD AND APPARATUS

CROSS REFERENCE TO RELATED APPLICATIONS

This application claims the benefit of U.S. Provisional Application No. 60/607,336, filed Sep. 3, 2004, the entire disclosure of which is hereby incorporated herein by reference.

FIELD OF THE INVENTION

The present invention is related to locating divers, and provides a diver module for association with a diver, and a boat module for association with a dive boat In particular, information related to the relative direction from one module to another is provided by the modules.

BACKGROUND

Scuba diving is a unique and enjoyable recreational experience. It is estimated that, every day, over 75,000 persons participate in the sport at thousands of diving resorts and operations worldwide.

Operationally, one aspect of the uniqueness of diving is that underwater communication is extremely limited and communication between divers and the surface is almost non-existent. The diving industry has developed several techniques to facilitate underwater communication—hand signals, writing on a slate, tapping on one's tank, and electronic communication devices. The first three require a close proximity for the communicating divers and, in the case of electronic means, are prohibitively expensive for all but commercial divers.

Limited visibility exacerbates communication difficulty. The "best" recreational ocean diving sites around the world have 150 feet of underwater visibility with a few locations having occasional periods of 200 feet. Most, however, have 60 feet or less. With few exceptions, visibility at inland sites drops below 20 feet. Considering that ocean currents in many dive areas may have a velocity of one to two knots, a diver in perfect visibility conditions can drift out of sight in less than 60 seconds.

Visibility is further reduced by underwater topography which may include coral or rock formations. Lastly, diving operators at most recreational dive sites offer a "night-diving" experience. Obviously, this limits communication even further and complicates the divemaster's supervisory responsibilities.

Major scuba-diving-certifying organizations have attempted to mitigate these risks by establishing smart and, fortunately, well-accepted rules: always dive with and stay close to a "buddy"; evaluate conditions carefully and seek orientation with a local dive shop before diving; plan the dive carefully, follow the plan once underwater, surface when one becomes separated from the group; etc. The fact remains, though, that the communication options available to the average recreational diver when in distress or when separated from the group are extremely limited. In contrast with a comparable land-based activity, backpacking, a lone hiker has the option of carrying an emergency satellite beacon should he become injured or miss-oriented. Divers have no such long-range option. At best, some recreational divers carry only a simple whistle or inflatable tube for use at the surface.

SUMMARY

Embodiments of the present invention provide the divemaster and the diver better control during an emergency by providing a means of alerting the divemaster of an emerging dangerous situation. In a diving emergency, time is the critical element. Continuing the backpacking analogy mentioned above, a miss-oriented hiker can wait to be rescued. His situation is static and, with the exception of injury, time is not necessarily a critical element. A diver's situation, in contrast, is dynamic: underwater, he has a limited air supply; on the surface, he may be carried out of sight and further from safety by currents. Government rescue services can take as long as two hours to arrive at the scene of a diving incident. The opportunity to positively affect the situation may have expired and the activity may become one of recovery rather than rescue. Given notification of a developing situation, immediate action on the part of the boat operator or divemaster may prevent a severe situation from becoming critical.

The system has three components: 1) small, omnidirectional RF and audio diver modules, 2) hydrophones for detecting the audio signals, and 3) a boat module/direction-finder interconnected to the hydrophones and incorporating an RF antenna. The diver module may be provided as part of a package that is approximately the size of a cell phone and attaches to the wrist or to the diver's equipment. The diver module activates upon entering the water and transmits alternating RF and audio signals continuously. Any boat module with the correct code can quickly locate another diver underwater or on the surface.

Embodiments of the present invention allow the divemaster to locate a diver during an emerging dangerous situation or emergency. In particular, a location signal receiver provided as part of a boat module on the dive boat may provide a directional indication pointing towards a diver to be located. The directional indication may be provided by: 1) the direction to a radio frequency location signal provided by a diver module associated with the diver to be located; 2) an audio signal transmitted by the diver module; or 3) both a radio frequency signal and an audio frequency signal.

In accordance with other embodiments of the present invention, the diver module comprises both a location signal receiver and a direction indicator in addition to a location signal transmitter. According to such embodiments, a diver may be provided with information indicating the relative direction to another diver. In accordance with still other embodiments of the present invention, the boat module may be provided with a location signal transmitter to allow a diver module having a receiver to provide the diver with an indication of the relative direction to the dive boat.

BRIEF DESCRIPTION OF THE DRAWINGS

FIGS. 1A-1D are schematic depictions of components of a diver locating system in accordance with embodiments of the present invention;

DETAILED DESCRIPTION

Figure 4:
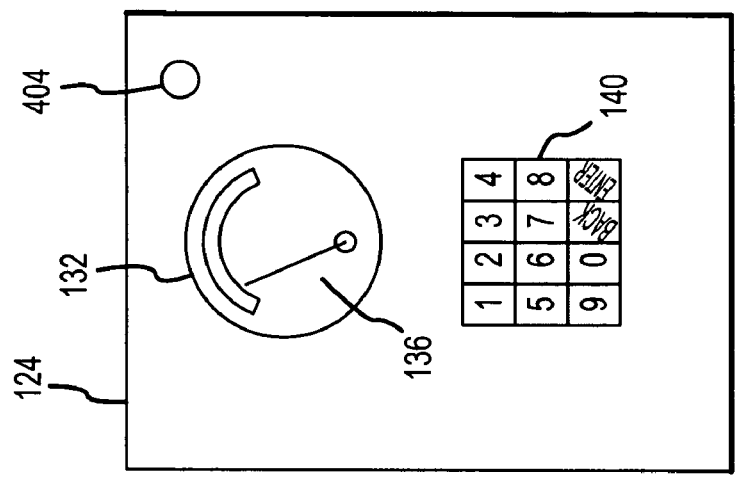
FIG. 4 is a schematic depiction of a boat module in accordance with embodiments of the present invention.

The concept of operation is shown in FIG. 1A. Here two divers are shown: one underwater 104a and one on the surface 104b. The diver module 108 activates upon water entry 112 (see FIG. 1B). Because electromagnetic waves do not travel far underwater, an audio frequency tone or signal 116 is produced for providing a location signal when the dive module 108 is submerged. On the surface, a radio frequency (RF) signal is acceptable. Therefore, an RF signal 120 is also produced. In heavy seas, a diver module 108 might alternate between under and above water. Therefore, in accordance with embodiments of the present invention, the diver module 108 produces alternating audio 116 and RF 120 signals. In accordance with other embodiments of the present invention, the audio signal 116 and RF signal 120 will be produced simultaneously or substantially simultaneously. For instance, an audio signal 116 having a defined frequency or that is modulated, for example to identify a particular diver module 108, may be generated during the same period of time that a radio frequency 120 having a particular frequency and/or that is modulated, for example to identify the diver module 108, is generated.

As shown in FIG. 1A, the diver locating system 100 may, in accordance with embodiments of the present invention, include a number of components. In particular, in addition to the diver module 108, the system 100 generally includes a boat module 124 located on the dive boat 128. As will be described in greater detail elsewhere herein, the boat module 124 generally is provided with the output from a hydrophone 144 to allow detection of the audio frequency signal 116. The boat module 124 also includes a radio frequency antenna 126 to allow detection of the radio frequency signal 120 generated by a diver module 108. In addition, as depicted in FIG. 1C, the boat module 124 generally includes electronics to calculate direction and a direction indicator 132. The direction indicator 132, an embodiment of which is depicted in greater detail in FIG. 1D, may include a needle or pointer 136, either mechanical or provided by a visual display such as a liquid crystal display, or other directional indicator for pointing in the direction of a diver module 108 and therefore an associated diver 104. As will be described in greater detail elsewhere herein, the input to the boat module 124 for controlling the direction indicator 136 may be derived from either or both the audio signal 116 and the RF signal 120. With reference again to FIG. 1C, the boat module 124 may also include a user input such as a keypad 140 for receiving various control inputs from an operator.

The system 100 also includes hydrophones or audio frequency transducers 144 that are interconnected to the boat module 124. In general, the hydrophone system 144 is directional, and therefore is capable of providing information regarding the direction from which an audio signal 116 originates with respect to the hydrophone system 144. Accordingly, a signal from the hydrophone system 144 can be used to provide information to the boat module 124 regarding the direction of a diver module 108 and associated submerged diver 104a with respect to the heading of the dive boat 128.

In accordance with embodiments of the present invention, when a diver 104 enters the water, the diver module 108 activates automatically. Once the diver 104 submerges, the surface operator places a hydrophone of the hydrophone system 144 in the water. During an underwater emergency, the diver module 108 produces an audio frequency signal 116 that is detectible by other diver modules 108 and by the hydrophone 144 (and by other divers if the audio frequency signal is an audible tone). The underwater divemaster first checks for accidental activation and, upon elimination of that possibility, takes the remaining divers 104 to the surface where they re-board the boat 128. Meanwhile, the hydrophone 144 has received the audible signal 116 and electronically notified the boat module 124. In response, the boat module 124 produces an audible tone or alarm alerting the boat operator. Once the remaining divers 104 are onboard, the boat operator steers the boat 128 toward the diver module's 108 location and stops directly over it. The divemaster(s) re-enters the water, descends directly to the distressed diver 104a, assists the diver 104a to the surface, and begins necessary first aid procedures.

When a submerged diver 104a becomes separated from the diver's group, accepted procedure is to ascend to the surface, locate the bubbles of the remainder of the group, and descend to rejoin them. If locating the group's bubbles proves impossible, the diver 104 seeks assistance from the dive boat operator. There have been instances where the surfaced diver(s) 104b could not locate the group's bubbles and were so far from the boat 128 that the operator could not hear their calls for help over the engines nor could he see the diver(s) 104b against ocean background. In other instances, divers 104 have simply been forgotten and left behind. In either of these instances, diver module 108 emergency signal activation causes the boat module 124 to sound an audible tone. This alerts the operator to a surfaced diver(s) 104b whom he cannot see or causes him to re-check the number of divers 104 he has onboard. Using the directional arrow 136 on the boat module 124, the boat operator steers the boat 128 toward the diver module 108, makes visual contact with the surfaced diver(s) 104, and proceeds with normal diver recovery operations.

Figure 3:
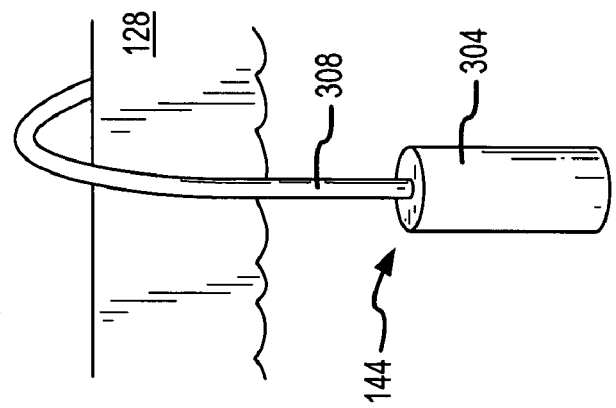
FIG. 3 is a schematic depiction of a directional hydrophone in accordance with embodiments of the present invention.

Features of the components of the system 100 are shown in greater detail in FIGS. 2-4. As stated previously, the system 100 generally includes 1) a small RF and audio diver module, 2) a directional hydrophone for detecting audio signals, and 3) a location signal boat module/direction-finder. In one scenario, the RF and audio location signal transmitter comprises the diver module 108, while the directional hydrophone 144 is interconnected to the boat module 124 operating as the location signal receiver/direction finder. However, in accordance with other embodiments of the present invention or in other scenarios, the boat module 124 may perform the function of the RF and audio location signal transmitter, while the directional hydrophone may be integrated with or interconnected to a diver module functioning as a location signal receiver. In accordance with still other embodiments of the present invention, the RF and audio location signal transmitter may comprise a first diver module 108, while the directional hydrophone and the location signal receiver may comprise a second diver module 108. Furthermore, location signal transmitter and location signal receiver functions may be performed by a module 108 or 124 simultaneously. For example, a module 108, 124 may function as an RF and audio transmitter to allow that module 108 or 124 to be tracked by another module 108 or 124, while simultaneously operating as a location signal receiver to track another module 108 or 124.

Figure 2A:
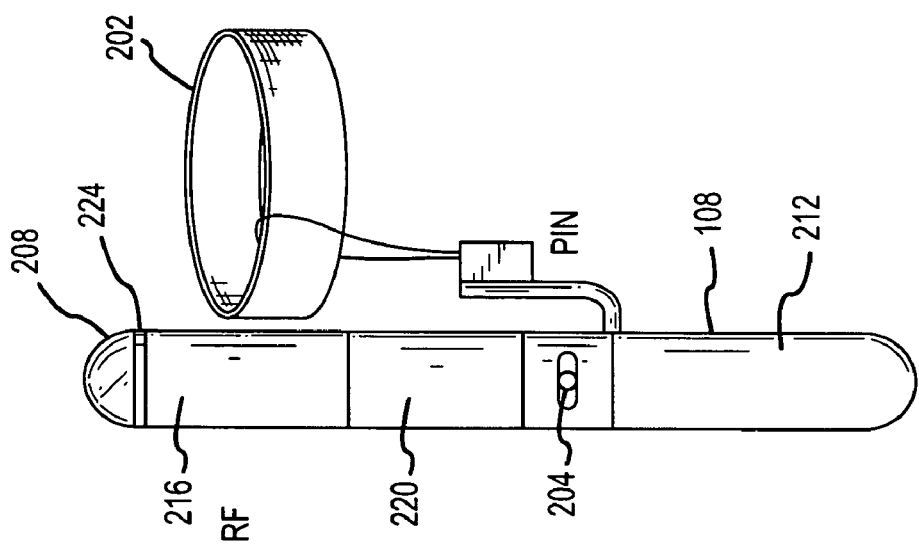
FIG. 2A is a depiction of a diver module in accordance with embodiments of the present invention.
Figure 2B:
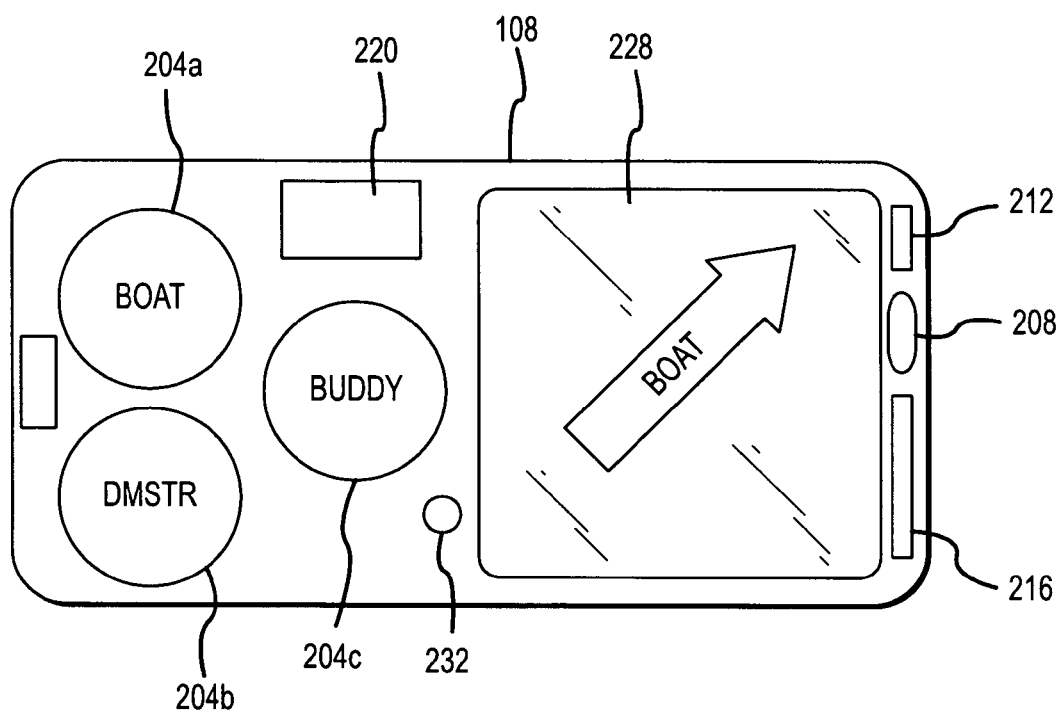
FIG. 2B is a depiction of a diver module in accordance with other embodiments of the present invention.

With particular reference now to FIGS. 2A and 2B, a diver module 108 is, in accordance with embodiments of the present invention, approximately the size of a cell phone and attaches to the diver's wrist or to the diver's equipment or suit. Each diver module 108 may have its own unique code. Each diver 104 entering the water wears a diver module 108. In an emergency, the diver 104 activates the diver module 108 using a button 204 on the front of the diver module 108. The diver module 108 may emit alternating audio 116 and RF 120 signals. In accordance with embodiments of the present invention, the diver module 108 is waterproof to an appropriate depth, for example to 330 feet (11 atmospheres). The diver module 108 may also include a visible beacon 208 to assist with diver location in murky, nighttime, or deep water.

In accordance with embodiments of the present invention, the diver module 108, as noted above, includes a manually operated switch 204. The switch 204 allows a diver 104 to select the operating mode of the diver module 108. For example, in accordance with embodiments of the present invention, the switch 204 may allow the diver 104 to control whether the diver module 108 is off, in order to conserve battery power, or on, in order to produce locating signals 116, 120. In accordance with other embodiments of the present invention, the switch 204 is a three-position switch that allows an additional selection of a standby mode by the diver 104 (See FIG. 2A). The standby mode may allow the diver module 108 to listen for a remote activation signal. A remote activation signal may be sent from a suitably equipped location signal boat module 124 or an activation device carried by another diver 104 (such as a diver module 108 capable of producing an activation signal) to cause the diver module 108 to generate location signals 116, 120. Remote activation may be desirable, for example, where the diver 104 associated with that diver module 108 has become incapacitated, or has been identified as missing.

In accordance with other embodiments of the present invention, the diver module 108 is activated to provide location signals 116, 120 throughout a dive. In addition, the diver module 108 may include a number of manually operated switches and a display screen or other visual output 228 (See FIG. 2B). For example, a diver 104 may press a first button 204a to receive information regarding the direction of the dive boat 128 with respect to the diver module 108 that is presented to the user by the visual output device or display 228. In accordance with embodiments of the present inventions the visual display 228 may comprise a liquid crystal display. As another example, the diver may press a second button or switch 204b to receive information regarding the direction of the dive master, who would wear a diver module 108 like any other diver 104, through the visual display 228. As yet another example, the diver 104 may press a third button 204c to cause information regarding the direction of another diver 104 wearing a diver module 108 to be displayed by the visual display 228. In accordance with embodiments of the present invention, the diver module 108, tracks other modules 108, 124 while submerged through one or more hydrophones 232. As illustrated in FIG. 2B, the hydrophones 232 may be integrated with the diver module 108 package. As can be appreciated by one of skill in the art, by coding the signals transmitted by modules 108, 124, other modules 108, 124 can selectively track them. In accordance with embodiments of the present invention, a diver 104 with a diver module 108 as illustrated in FIG. 2B can signal an emergency by holding down any one of the buttons 204a-c for at least a predetermined period of time. Once a diver 104 has indicated an emergency, a coded signal is sent from that diver's diver module 108 to indicate to other modules 104, 124 (or at least to the boat module 124) that an emergency has been declared. In accordance with still other embodiments, the boat module 124 may be used to signal an emergency to diver modules 108, for example to call the divers 104 back to the dive boat 128.

The beacon or signal light 208 may generally be operated in conjunction with the audio frequency 116 and radio frequency 120 location signals, or after an emergency has been indicated by the diver 104 (for example by holding a switch 204 down for a period of time) or through the receipt of a remote activation signal. The beacon 208 may comprise a high intensity strobe light to assist in visually locating the diver 104 associated with the diver module 108.

An audio emitter 212 may be provided for producing and/or emitting the audio signal 116 used to provide location information when the diver 104 and the associated diver module 108 are submerged. As can be appreciated by one of skill in the art from the description provided herein, the audio emitter 212 may comprise a signal generator operating at audible sub-sonic or ultrasonic frequencies, an amplifier, and an acoustic transducer. As used herein, audible frequencies may include frequencies that are within the range of normal human hearing. Furthermore, audio frequencies may include frequencies that are sub-sonic or ultrasonic, and therefore outside of the range of human hearing.

A radio frequency antenna 216 may be provided for transmission of the radio frequency signal 120. As can be appreciated by one of skill in the art from the description provided herein, the radio frequency antenna 216 may be associated with radio frequency signal generators and amplifiers. As used herein, radio frequencies may include frequencies from about 3 kHz to about 300 GHz.

Electronics 220 generally provide for the control and output of various of the components included in the diver module 108. For example, the electronics 220, in response to the mode selected by operation of the switch 204, selectively operate the radio frequency signal emitter 216 and audio emitter 212. Operation of the electronics 220 may also include modulation of the audio 116 and/or radio frequency 120 signals. When so equipped, the electronics 220 may also energize a remote activation receiver section 224, to listen for a remote activation signal. In addition the electronics operate in cooperation with a receiving device, such as a hydrophone 232 (or an antenna 216 if the diver module 108 is on the surface), to determine the direction to another module 108, 124, and to display the direction information on the visual output 228. The electronics 220 may also include a battery or other power supply.

Figure 5A:
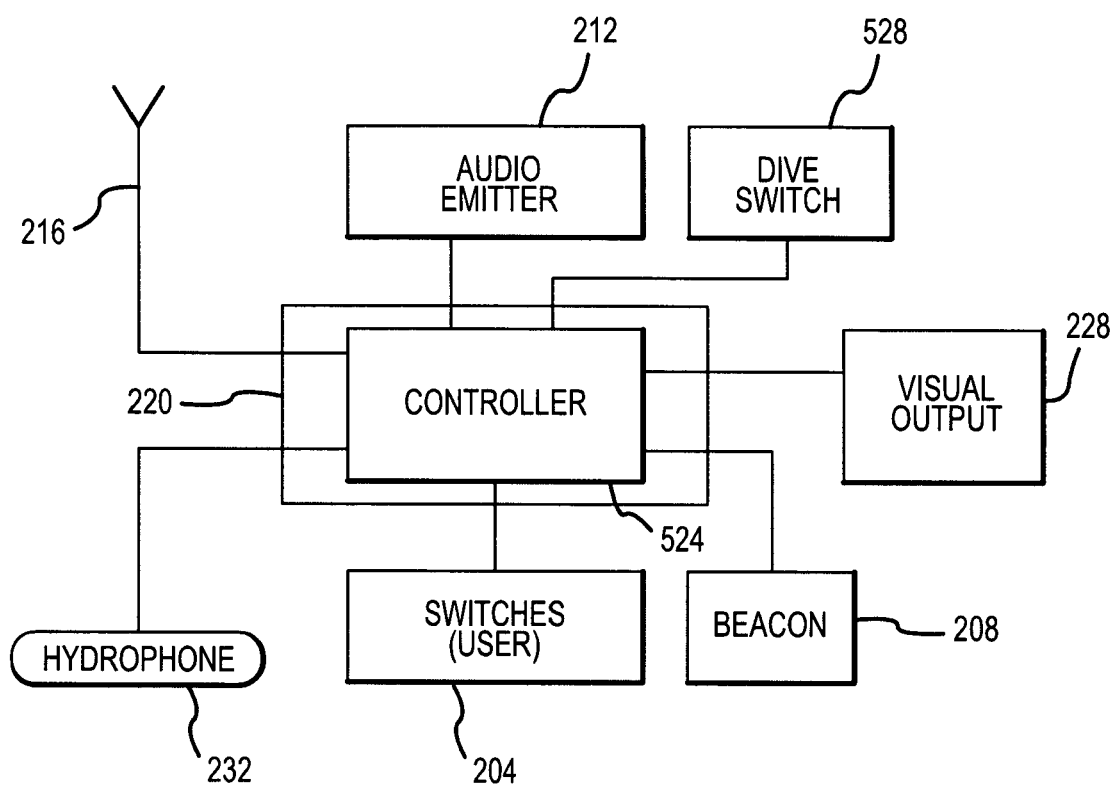
FIG. 5A is a schematic depiction of components associated with a diver module in accordance with embodiments of the present invention.

With reference to FIG. 5A, components of a diver module 108 in accordance with embodiments of the present invention are illustrated. In general, the diver module 108 includes a radio frequency (RF) antenna 216 for transmitting location signals to the boat module 124 and/or other diver modules 108. In accordance with embodiments of the present invent, each diver module 108 transmits an encoded signal, to allow particular diver modules 108 to be tracked. In accordance with other embodiments of the present invention, the RF antenna 216 can be used in connection with receiving RF location signals transmitted by other diver modules 108, or by the boat module 124. The RF location signal can be encoded to allow the sending module 108, 124 to be identified and selectively tracked. The diver module 108 also generally includes an audio emitter 212 for transmitting audible location signals. In accordance with embodiments of the present invention, audible location signals produced by the audio emitter 212 are encoded to allow other modules 108, 124 to track a selected diver module 108. One or more hydrophones 232 may be provided to permit tracking of other diver modules 108 or a boat module 124. The operation of the various components may be coordinated by a controller 524 provided as part of the electronics 220 of the diver module 108. For example, based on an audio 116 and/or RF 120 signal received from another module 108, 124, the controller 524 can identify the location signal 116 or 120 of a selected module 108 or 124, and provide information to the diver 104 regarding the relative direction to the selected module 108 or 124 using the visual display 228. The diver module 108 may also include a dive switch 528 to provide a signal to the controller 524 to activate the audio emitter 212 and RF antenna 216 to transmit coded location signals 116, 120 when the diver module 108 is in the water.

In accordance with embodiments of the present invention, each boat module 124 used by a dive operation holds the unique codes for each of that operation's individual diver modules 108. In this way, one dive operation will not interfere with another operating in the same area. A universal mode or modes may also be provided to allow a boat module 124 to assist in general search and rescue operations. In addition, embodiments of the present invention may include a suitably equipped boat module 124 to allow the boat operator to activate any of its associated diver modules 108. That is, if a diver 104 is missing upon reloading the boat 128, the divemaster may assume that the missing diver 104 is incapacitated and is unable to activate his own diver module 108. In this situation, the boat operator can activate the missing diver module 108 by entering its unique code using the user input 140. Upon diver module 108 activation, diver recovery proceeds as described in the concept of operation above.

The directional hydrophone 144 (see FIG. 3) detects the direction of the diver module's underwater audio signal 116. The hydrophone 144 then sends a signal to the boat module 124, which adjusts the needle 136 direction allowing the boat operator to steer the boat 128 to the diver module 108. The hydrophone 144 may include a directional transducer 304 and a cable 308 interconnecting the directional acoustic transducer 304 to the boat module 124. In general, the directional acoustic transducer 304 and cable 308 are adapted for use while the transducer 304 is submerged. In addition, the provision of a cable 308 allows the transducer 304 to be selectively submerged when in use, and taken back on board the boat 128 when not in use by a crew member of the boat 128. Alternatively, embodiments of the present invention may utilize a hydrophone assembly 144 that is rigidly or rotatably mounted to the boat 128.

The boat module 124 (FIG. 4) stays on the boat 128 with the boat operator. In accordance with embodiments of the present invention, the boat module 124 is "ruggedized" to survive the rough, small-boat environment. In addition, the boat module 124 may be waterproof, for example to 330 feet. The boat module 124 may also have a visible beacon 404 that is activated upon immersion to aid in recovery when lost overboard at night. When a diver 104 activates an emergency signal function of his diver module 108, an audible alarm sounds at the boat module 124. A simple direction-indicator needle 136 directs the operator to steer left or right as he moves toward the diver module. When the boat module 124 is directly over the diver module 108, the needle reverses direction, allowing the operator to position the boat directly over an underwater diver 104*b*.

Figure 5B:
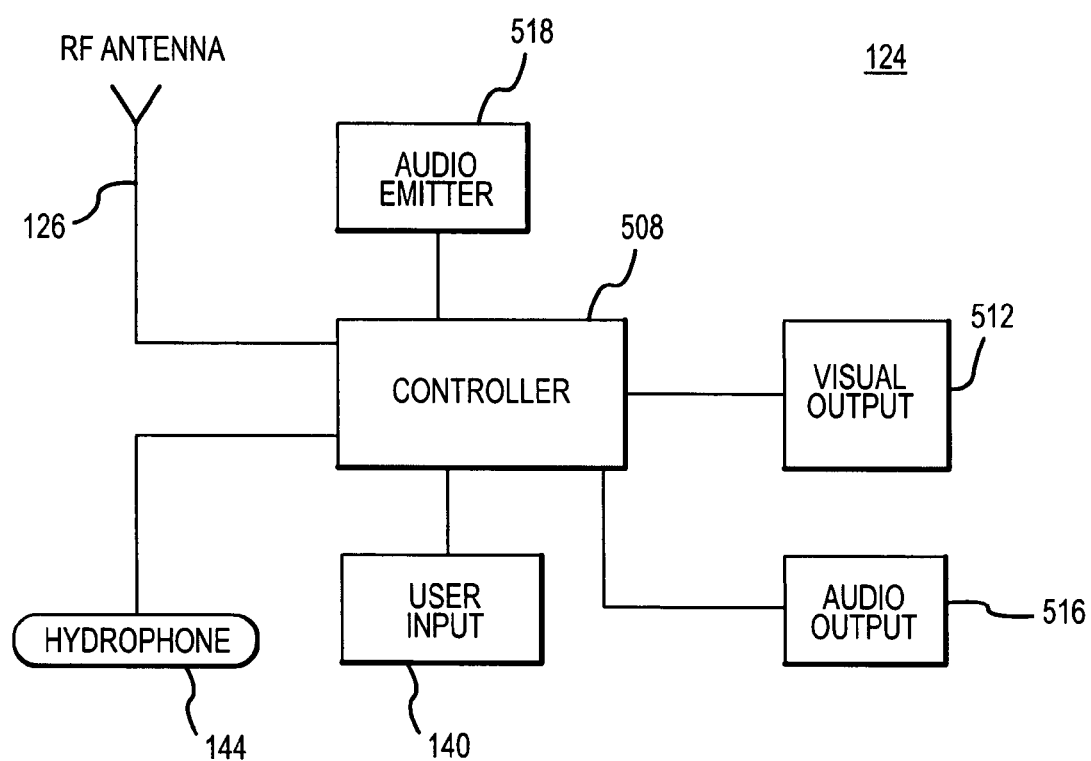
FIG. 5B is a schematic depiction of components associated with a boat module in accordance with embodiments of the present invention.

With reference now to FIG. 5B, components of a boat module 124 in accordance with embodiments of the present invention are illustrated. In general, the boat module 124 includes a radio frequency (RF) antenna 126 for receiving a radio frequency signal 120 produced by a diver module 108, such as may be associated with a surfaced diver 104*b*. The radio frequency antenna 126 may provide a signal indicating the direction relative to the boat module 124 from which the radio frequency signal 120 is received. In accordance with embodiments of the present invention, the radio frequency antenna 126 may comprise a number of antennas, for example to provide a diversity signal. An antenna 504 may also transmit a radio frequency location signal that can be detected by a suitably equipped diver module. The RF antenna 126 may also be used to transmit a diver module 108 activation signal. The boat module 124 also generally includes an input from a hydrophone 144. As stated above, the hydrophone 144 may be directional, to provide an indication to the location signal boat module 124 of the direction of a submerged diver 104*a*. Alternatively or in addition, a number of hydrophones 144, which may or may not be directional, may be used, for example to provide a diversity-type signal. The boat module 124 may also include or be associated with an audible or ultrasound frequency emitter 518 for transmitting a diver module 108 activation signal. Furthermore, an audible or ultrasound frequency emitter 518 may be provided for providing audible or ultrasound frequency location signal that can be detected by a suitably equipped diver module 108. An audio emitter 108 may be associated with the hydrophone 144 to provide a single portion or part of the boat module 124 that must be submerged in order to be operable.

The boat module 124 may, additionally, include a controller 508. The controller 508 may function to demodulate encoded audio 116 or radio frequency 120 signals to identify a particular diver module 108 and/or to only track desired diver modules 108. The controller 508 may also condition a received signal, for example by amplifying and/or filtering the signal from the radio frequency antenna 126 or the hydrophone 144. In addition, the controller 508 may function to provide a signal to a visual output device 512, such as a direction indicator 132 to provide steering information to the boat operator. The signal provided to the visual output 512 may comprise a signal derived from one or both of the audio signal 116 or radio frequency signal 120. Accordingly, the controller 508 may incorporate or implement a multiplexer. For example, the controller 508 may use a signal from the radio frequency antenna 126 or from the hydrophone 144, depending on which signal is stronger. In accordance with other embodiments of the present invention, the controller 508 may alternately sample the signal from the radio frequency antenna 126 or the directional hydrophone 144. The location signal boat module 124 may additionally include an audio output 516. The audio output 516 may provide a sequence of tones, for example to provide an indication of the heading to a diver module 108. Alternatively or in addition, the audio output 516 may provide an audible alarm signal, for example upon a signal 116 or 120 being detected. A power supply 520, for example a battery, may also be provided.

Figure 6:
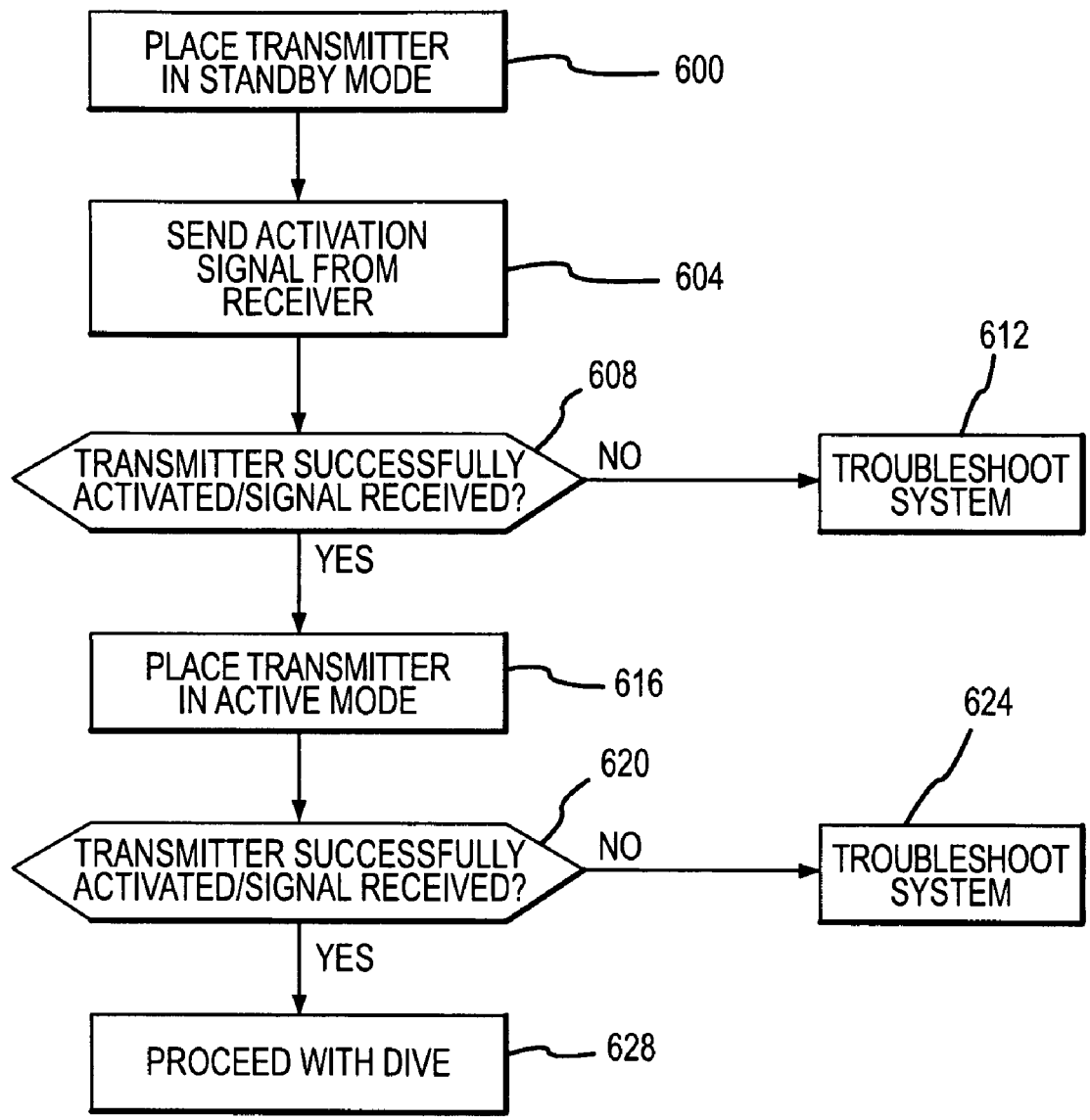
FIG. 6 is a flowchart depicting aspects of the operation of a diver locating system in accordance with embodiments of the present invention.

With reference now to FIG. 6, aspects of the operation of a system 100 in accordance with embodiments of the present invention are illustrated. Initially, at step 600, the diver module 108 associated with the diver 104 is placed in a standby mode. The standby mode may be selected by operating the switch 204 provided as part of the diver module 208 to place the switch 204 in a standby mode position. At step 604, an activation signal is sent from the boat module 124. As can be appreciated by one of skill in the art from the description provided herein, the activation signal may be transmitted by a boat operator or divemaster when it is determined that a diver 104 is missing. The operator may initiate the activation signal by entering a command and/or code associated with the diver module 108 using the user input 140 of the boat module 124 or another activation device. At step 608, a determination is made as to whether the diver module 108 was successfully activated or placed in an active mode to indicate that the activation signal was successfully received. If the diver module 108 is not successfully activated, the operator should troubleshoot the system (step 612). If the diver module 108 is successfully activated, that activation may be cleared, and the diver module may then be manually placed in an active mode using the switch 204 (step 616). At step 620, a determination is made as to whether the diver module 108 has been successfully activated, and whether one or both of the audio or radio frequency signals 116, 120 have been received at the location signal boat module 124. If activation of the diver module 108 has not been successful and/or signals from the diver module 108 are not successfully received by the boat module 124, the operator should troubleshoot the system (step 624). If the diver module 108 has been successfully activated, diver module is returned to the standby mode using the switch 204 and the diver 104 may then proceed with the dive (step 628).

Figure 7:
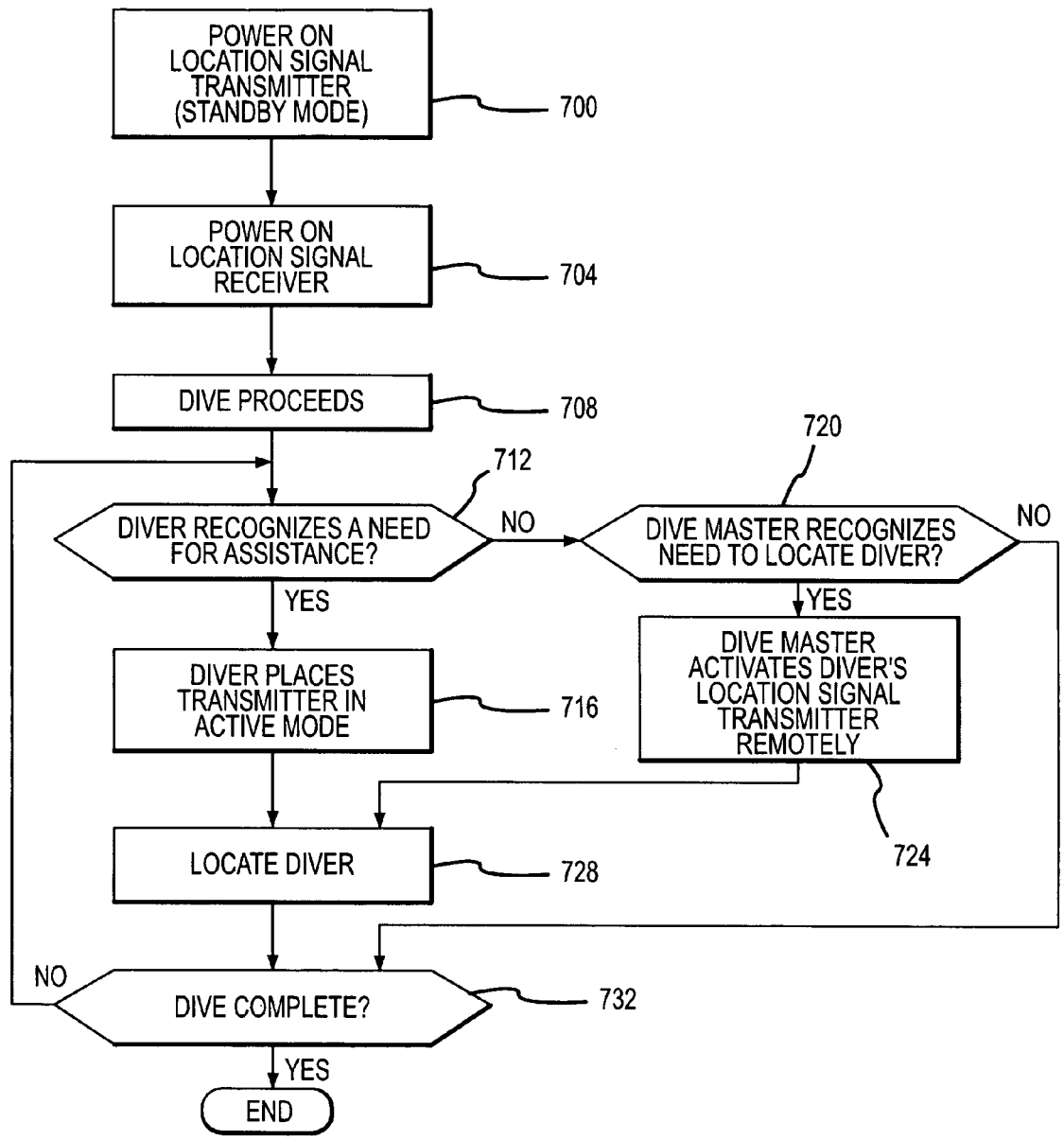
FIG. 7 is a flowchart depicting additional aspects of the operation of a diver locating system in accordance with embodiments of the present invention.

With reference now to FIG. 7, additional aspects of the operation of a system 100 in accordance with embodiments of the present invention are illustrated. Initially, at step 700, the diver module 108 is powered on and placed in standby mode. At step 704, the location signal boat module 124 is powered on. The dive may then proceed (step 708).

At step 712, a determination may be made as to whether a diver 104 recognizes a need for assistance. If a diver 104 has recognized a need for assistance, that diver 104 places his or her diver module 108 in an active mode (step 716). For example, the diver 104 may operate the switch 204 to place the diver module 108 in an active mode, such that an audio signal 116 and radio frequency signal 120 are generated. Where the switch 204 comprises or includes a pin, activation of the diver module 108 may comprise pulling the pin from the switch 204 mechanism. If the diver has not recognized a need for assistance, a determination may be made as to whether the divemaster has recognized a need to locate a diver 104 (step 720). If the divemaster has recognized a need to locate a diver 104, the divemaster may use a remote activation device to activate the missing diver's diver module 108 (step 724).

After a diver 104 has placed a diver module 108 in an active mode, or after the divemaster has remotely placed a diver module 108 in an active mode, steps may be taken to locate the diver (step 728). Such steps are described in greater detail elsewhere herein, including in connection with FIG. 8. At step 732, a determination may be made as to whether the dive is complete. If the dive is complete, the diver modules 108 of the divers and the boat module 124 may all be powered off, and the process may end. If the dive is not complete, the process may return to step 712.

Figure 8:
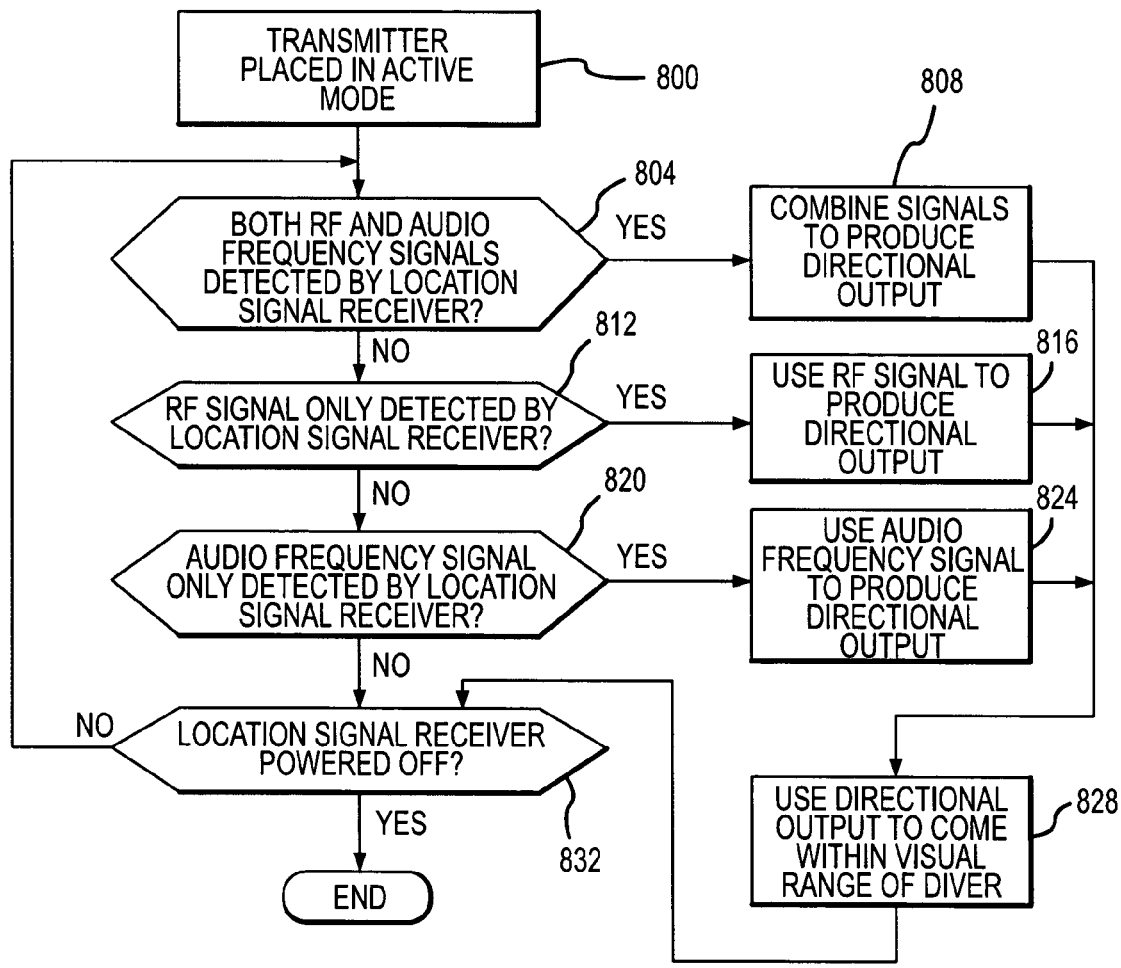
FIG. 8 is a flowchart depicting additional aspects of the operation of a diver locating system in accordance with embodiments of the present invention.

With reference now to FIG. 8, additional aspects of the operation of a system 100 in accordance with embodiments of the present invention are illustrated. Initially, in step 800, a diver module 108 is placed in an active mode. As noted elsewhere herein, placing a diver module 108 in an active mode may be performed by operation of a switch 204 associated with that diver module 108. Alternatively, embodiments of the present invention may permit activation of the diver module 108 remotely, for example by a device carried by the divemaster and/or the boat operator.

In step 804, a determination is made as to whether both a radio frequency 120 and audio frequency 116 signal are detected by the diver module 124. If both signals 116, 120 are received, they are combined to produce a directional output at the visual output 512 of the location signal boat module 124 (step 808). If both signals 116, 120 are not detected, a determination is made as to whether a radio frequency signal 120 is detected by the location signal boat module 124. If the radio frequency signal 120 is detected, then the radio frequency signal 120 is used to produce the directional output provided by the visual output 512 of the location signal boat module 124 (step 816). If the radio frequency signal is not detected, a determination is made as to whether the audio frequency signal 116 is detected by the location signal boat module 124. If the audio frequency signal 116 is detected, then that signal 116 is used to produce the directional output provided by the visual output 512 of the location signal boat module 124.

In accordance with embodiments of the present invention, the directional output provided at steps 808, 816 or 824 are then used to come within visual range of the missing diver 104 (step 828). In particular, the boat operator may steer the boat in the direction indicated by the directional indicator 136. With respect to a surfaced diver 104b, the boat operator may continue to steer in the indicated direction until the diver 104b is in visual range. With respect to a submerged diver 104a, the directional indicator will reverse or rapidly change direction when the boat 128, and more particular the hydrophone 144, passes directly over the diver 104a. The divemaster can then enter the water and dive to locate the diver 104a needing assistance. After visually locating the diver 104, the process may end. If at step 820 the audio frequency signal 116 is not detected, or after using the directional indicator to approach the diver, a determination is then made as to whether the location signal boat module 124 has been powered off (step 832). If the location signal boat module has not been powered off, the process may return to step 804. If the location signal boat module has been powered off, the process ends.

Although embodiments of the present invention have been described in connection with a location signal boat module 124 that is fixed to a dive boat 128, it should be appreciated that the present invention is not so limited. For example, in addition or as an alternative to a boat mounted location signal boat module 124, a dive master may carry a location signal receiver. In addition, embodiments of the present invention may permit the reception of any compatible diver module 108 in the case of an emergency, rather than just those diver modules 108 associated with a particular dive operation. This facility allows any suitable location signal receiver 108 or 124 to be used in connection with general rescue operations.

In connection with embodiments of the present invention that provide for the remote activation of a diver module 108, a suitable activation signal may be provided by a module 108 or 124 that includes an activation signal transmission capability. In accordance with embodiments of the present invention, an activation signal may comprise both an audio frequency signal, for activating a diver module 108 that is submerged, and a radio frequency signal for activating a diver module 108 that is surfaced. Alternatively, a location signal boat module 124 may be provided with a lesser activation capability. For example, only an audio frequency activation signal may be possible in connection with a particular boat module 124 and diver module 108. The activation signal may be coded to activate only a selected diver module 108.

In addition to including a remote activation capability as part of a module 108 or 124, embodiments of the present invention may provide a remote activation device that is separate from the location signal boat module 124. For example, a divemaster may be provided with a remote activation device. As with a location signal boat module 124 activation capability, a remote activation device may include both audio frequency and radio frequency activation signals, only an audio frequency activation signal or only a radio frequency activation signal.

In accordance with still other embodiments of the present invention, information regarding whether a diver module 108 sending a location signal 116 or 120 is submerged or not may be provided. For example, information regarding whether a radio frequency signal 120 is being received by a location signal boat module 124, either continuously or intermittently, may be provided to the operator as an indication that the diver to be located is at the surface.

Figure 9:
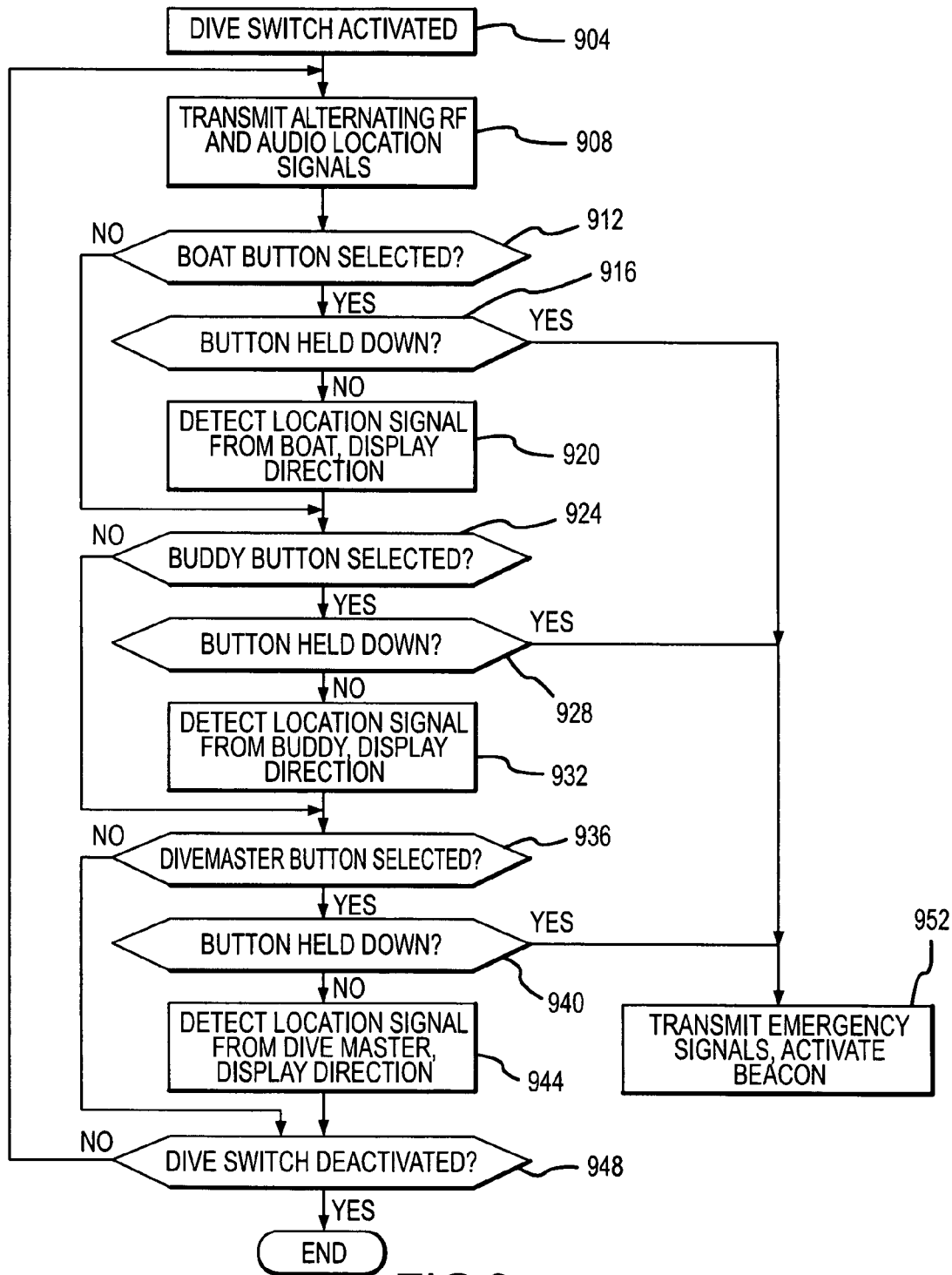
FIG. 9 is a flowchart depicting additional aspects of the operation of a diver locating system in accordance with embodiments of the present invention.

With reference to FIG. 9, aspects of the operation of a system 100 in accordance with still other embodiments of the present invention are illustrated. Initially, the dive switch 528 of a diver module 108 is activated (Step 904). Activation of the dive switch may comprise manual activation through a switch 204 by the diver 104. Alternatively or in addition, the dive switch 528 may be activated upon detecting that the diver module 108 has been submerged or otherwise detecting that a dive has started. In response to activation of the dive switch 528, the diver module 108 transmits alternating RF and audio frequency location signals 116, 120 (Step 908). Alternatively, RF and audio location signals may be transmitted continuously. The RF 116 and audio 120 signals are coded to identify the diver module 108.

At Step 912, a determination is made as to whether the boat 204a button has been selected. If the boat button has been selected, a determination is made as to whether the boat button 204a has been held down for at least a predetermined period of time. If the boat button 204a has not been held down for at least the predetermined period of time, the diver module 108 tracks the relative position of the boat module 124 by detecting the location signal from the boat module 124 associated with the dive boat 128, and displays the direction to the boat 128 to the diver 104 through the visual output 228 (Step 920).

After detecting the location signal from the boat module 124 and displaying the direction, or after determining that the boat button 204a has not been selected, a determination may be made as to whether the buddy button 204c has been selected (Step 924). If the buddy button 204c has been selected, a determination is made as to whether the buddy button 204c has been held down for more than the predetermined period of time (Step 928). If the button has not been held down for more than a predetermined period of time, the location signal from a diver module 108 associated with the diver's buddy is detected, and the direction to that diver module 108 is displayed, to provide tracking of the buddy's diver module 108 (Step 932). In accordance with embodiments of the present invention, a buddy diver module 108 may be selected by programming the diver module 108 to detect location signals from a particular diver module 108 is designated as the buddy.

After detecting the location signal from a buddy diver module 108, or after determining that the buddy button 204c has not been selected, a determination may be made as to whether the divemaster button 204b has been selected (Step 936). If the divemaster button 204b has been selected, a determination may be made as to whether the divemaster button 204b has been held down for more than a predetermined period of time (Step 940). If the divemaster button 204b has not been pressed for more than the selected period of time, the location signal from the divemaster's diver module 108 is detected, and the direction to the divemaster is displayed by the visual output 228 to track the relative position of the divemaster's diver module 108 (Step 944).

If it is determined that the divemaster button 204b has not been selected, or after detecting the location signal from the divemaster and displaying the direction, a determination may be made as to whether the dive switch 512 has been deactivated (Step 948). If the dive switch 512 is deactivated, the process may end. If the dive switch 512 has not been deactivated, the process may return to Step 908, and the diver module 108 may continue to transmit alternating RF and audio location signals (Step 908).

If it is determined at Steps 916, 924 or 940 that one of the buttons 204 has been held down for more than a predetermined period of time, the diver module 108 is placed in an emergency mode. In the emergency mode, emergency RF and audio frequency signals are transmitted by the diver module 108, and the beacon 208 is activated (Step 952). Transmission of emergency signals may comprise sending a coded signal that indicates to receiving modules 108, 124 that the diver 104 associated with the diver module 108 requires assistance in addition to or as part of location signals 116, 120.

As can be appreciated by one of skill in the art from the description provided herein, the module 108, 124 that is tracked after the diver 104 presses one of the buttons 204 may be programmed into the diver module 108 prior to the dive. Programming can include automatically recognizing or detecting other modules 108, 124. In accordance with further embodiments of the present invention, other modules 108, 124 that are to be tracked by a first module 108, 124 can be selected from a list of the other modules 108, 124 presented by the visual display 228.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A system for locating divers, comprising:
a submersible diver module, said diver module including:
a radio frequency transmitter;
an audio frequency transmitter; and
a switch, wherein an operating mode of said diver module can be selected, said operating mode including an active mode, wherein in said active mode said radio frequency transmitter produces a radio frequency location signal and said audio frequency transmitter produces an audio frequency location signal, and wherein said radio frequency location signal and said audio frequency location signal are produced in at least one of an alternating fashion, simultaneously or substantially simultaneously;
a boat module, said boat module including:
a directional hydrophone, wherein said directional hydrophone is operable to receive location signals from said audio frequency transmitter of said diver module at least when said diver module is submerged; and
a location signal receiver, said location signal receiver including:
a directional radio frequency receiver, wherein said directional radio frequency receiver is operable to receive location signals from said radio frequency transmitter of said diver module at least when said diver module is not submerged;
an input from said directional hydrophone; and
a directional output, wherein said directional output points towards said diver module when said diver module is in an active mode and at least one of said radio frequency location signal and said audio frequency location signal is received at said boat module.

2. The system of claim 1, wherein said diver module selector switch comprises a three position switch.

3. The system of claim 1, wherein said diver module further includes a visible beacon.

4. The system of claim 1, wherein said diver module includes an activation signal receiver, wherein said location signal receiver further comprises a location signal transmitter activation, wherein said diver module operating mode includes a stand-by mode, and wherein said diver module is placed in said active mode in response to an activation signal received from said location signal receiver.

5. A method for locating a diver, comprising:
placing a submersible first diver module in an active mode;
while said diver module is in said active mode:
periodically transmitting from said first diver module a radio frequency location signal;
periodically transmitting from said first diver module an audio frequency location signal;
while said submersible first diver module is not submerged, receiving at a receiving device said periodically transmitted radio frequency signal transmitted from said first diver module; and
submerging said first diver module and while said first diver module is submerged receiving at said receiving device said periodically transmitted audio frequency signal but not said periodically transmitted radio frequency signal.

6. The method of claim 5, wherein said placing a first diver module in an active mode includes:
placing said first diver module in a standby mode;
providing to said first diver module an activation signal, wherein said activation signal is provided by one of a boat module and a second diver module.

7. The method of claim 6, wherein said placing said first diver module in a standby mode comprises operating a manually controlled switch to place said switch in a standby mode position.

8. The method of claim 5, wherein said placing said first diver module in an active mode comprises operating a manually controlled switch to place said switch in an active mode position.

9. The method of claim 8, wherein said operating said manually controlled switch comprises said diver operating said switch.

10. The method of claim 5, wherein said placing said first diver module in an active mode comprises determining that said first diver module is in water.

11. The method of claim 5, wherein said radio frequency signal and said audio frequency signal are transmitted simultaneously.

12. The method of claim 5, wherein said transmitting of radio frequency signal and said transmitting of said audio frequency signal are performed alternately.

13. The method of claim 5, wherein said radio frequency signal and said audio frequency signal are coded to identify said diver module.

14. The method of claim 13, further comprising:
selecting at said first diver module a first one of a second diver module and a boat module to track;
detecting at said first diver module at least one of an audio frequency signal and a radio frequency signal transmitted by said selected first one of a second diver module and a boat module;
displaying by said first diver module a direction to said selected first one of a second diver module and a boat module.

15. The method of claim 14, further comprising:
selecting at said first diver module a second one of a second diver module and a boat module to track;
detecting at said first diver module at least one of an audio frequency signal and a radio frequency signal transmitted by said selected second one of a second diver module and a boat module;
displaying by said first diver module a direction to said selected second one of a second diver module and a boat module.

16. The method of claim 14, wherein said first diver module continues to transmit a radio frequency location signal and an audio frequency location signal while tracking said selected first one of a second diver module and a boat module.

17. The method of claim 5, further comprising:
activating at said first diver module an emergency signal;
transmitting from said first diver module a radio frequency emergency signal;
transmitting from said first diver module an audio frequency emergency signal.

18. The method of claim 17, further comprising:
in response to said activating at said first diver module an emergency signal, activating a visible emergency beacon associated with said first diver module.

19. A diver module device, comprising:
means for periodically transmitting a radio frequency signal while said diver module device is in an active mode;

means for periodically transmitting an audio frequency signal while said diver module device is in said active mode, wherein said means for periodically transmitting a radio frequency and said means for periodically transmitting an audio frequency operate alternately simultaneously, or substantially simultaneously, wherein said means for transmitting a radio frequency provides a first radio frequency location signal, wherein said means for transmitting an audio frequency provides a first audio frequency location signal, wherein said radio frequency signal is received by a receiving device at least while said diver module is not submerged, and wherein said audio frequency signal is received by the receiving device at least while said diver module is submerged.

20. The device of claim 19, wherein said first radio frequency location signal comprises a first coded radio frequency location signal, and wherein said first audio frequency location signal comprises a first coded audio frequency location signal, said device further comprising:

means for receiving a second coded audio frequency location signal generated by one of another diver module and a boat module;

means for displaying a direction of said one of another diver module and a boat module.

* * * * *

UNITED STATES PATENT AND TRADEMARK OFFICE
CERTIFICATE OF CORRECTION

PATENT NO. : 7,388,512 B1 Page 1 of 1
APPLICATION NO. : 11/218790
DATED : June 17, 2008
INVENTOR(S) : Daniel Moorer, Jr.

It is certified that error appears in the above-identified patent and that said Letters Patent is hereby corrected as shown below:

In Claim 19, at column 15, line 5, please add a -- , -- after the word "alternately".

Signed and Sealed this

Nineteenth Day of August, 2008

JON W. DUDAS
*Director of the United States Patent and Trademark Office*